(12) United States Patent
Kato et al.

(10) Patent No.: US 9,523,020 B2
(45) Date of Patent: Dec. 20, 2016

(54) FLATTENING FILM FORMING COMPOSITION FOR HARD DISK

(71) Applicant: NISSAN CHEMICAL INDUSTRIES, LTD., Tokyo (JP)

(72) Inventors: Taku Kato, Funabashi (JP); Masayuki Haraguchi, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 47 days.

(21) Appl. No.: 14/346,465

(22) PCT Filed: Sep. 18, 2012

(86) PCT No.: PCT/JP2012/073816
§ 371 (c)(1),
(2) Date: Mar. 21, 2014

(87) PCT Pub. No.: WO2013/042655
PCT Pub. Date: Mar. 28, 2013

(65) Prior Publication Data
US 2014/0235743 A1    Aug. 21, 2014

(30) Foreign Application Priority Data
Sep. 22, 2011   (JP) ................. 2011-207129

(51) Int. Cl.
| C09D 167/00 | (2006.01) |
| C09D 125/08 | (2006.01) |
| C08F 230/08 | (2006.01) |
| G11B 5/65 | (2006.01) |
| G11B 5/72 | (2006.01) |
| G11B 5/84 | (2006.01) |

(52) U.S. Cl.
CPC ........... *C09D 167/00* (2013.01); *C09D 125/08* (2013.01); *G11B 5/65* (2013.01); *G11B 5/72* (2013.01); *G11B 5/84* (2013.01); *G11B 5/8404* (2013.01); *G11B 5/8408* (2013.01); *C08F 230/08* (2013.01)

(58) Field of Classification Search
CPC .... C09D 167/00; C09D 125/08; C08F 230/08; G11B 5/65; G11B 5/84; G11B 5/8404; G11B 5/8408; G11B 5/72
See application file for complete search history.

(56) References Cited

U.S. PATENT DOCUMENTS

| 2007/0031706 A1 | 2/2007 | Okawa et al. |
| 2011/0019307 A1 | 1/2011 | Arai et al. |

FOREIGN PATENT DOCUMENTS

| JP | A-2005-100496 | 4/2005 |
| JP | A-2009-259370 | 11/2009 |
| JP | A-2010-24330 | 2/2010 |
| WO | WO 2012/086692 A1 | 6/2012 |

OTHER PUBLICATIONS

International Search Report issued in International Application No. PCT/JP2012/073816 on Dec. 25, 2012 (with translation).
Written Opinion of the International Searching Authority issued in International Application No. PCT/JP2012/073816 on Dec. 25, 2012 (with translation).

*Primary Examiner* — Sanza McClendon
(74) *Attorney, Agent, or Firm* — Oliff PLC

(57) ABSTRACT

A flattening film forming composition for a hard disk that can prevent a magnetic material from migrating to the nonmagnetic layer, including a photopolymerizable coating material containing at least one polymer selected from a homopolymer that has a divinyl aromatic compound-derived unit structure and a copolymer having the unit structure or containing a mixture of the polymer and a photopolymerizable compound. The photopolymerizable compound may include an acrylate group, a methacrylate group, or a vinyl group. The polymer may be a copolymer further containing an addition polymerizable compound as a component to be copolymerized. A method for producing a hard disk, including: a first step of forming projections and recesses on a magnetic body; a second step of coating the projections and recesses with the flattening film forming composition; and a third step of flattening the coating by means of etching and exposing a surface of the magnetic body.

18 Claims, 2 Drawing Sheets

FLATTENING FILM FORMING COMPOSITION FOR HARD DISK

TECHNICAL FIELD

The present invention relates to a coating forming composition for a hard disk and a method for producing a hard disk using the same. A coating formed from the composition of the present invention has effects in flattening and prevention of a magnetic substance from migrating to the coating layer.

BACKGROUND ART

Capacity enlargement and downsizing of a hard disk drive have progressed with improvement in performance of its head and improvement in performance of its drive media (magnetic body).

In terms of the improvement in performance of the media drive, the capacity enlargement has progressed by increasing the surface recording density. The increase in the recording density has an issue of magnetic field expansion from a magnetic head. The issue leads to downsizing of the magnetic head, but there is a limit to such downsizing. The magnetic field expansion cannot be reduced to a certain value or below, and therefore a phenomenon called side write occurs. Side write causes writing to an adjacent track at the time of recording, which overwrites and erases previously recorded data. The magnetic field expansion also causes reading of an extra signal from an adjacent track at the time of regeneration, which causes crosstalk.

To solve such an issue, a technique such as a discrete track medium and a bit pattern medium has been developed in which a space between tracks is filled with a nonmagnetic material to separate the tracks physically and magnetically (Patent Document 1).

A coating forming composition containing a nonmagnetic material covers a magnetic layer that is formed on a substrate and has projections and recesses, and the coating is etched back by means of dry etching to the surface of the magnetic layer. Thus, the filler of the nonmagnetic material between the tracks forms a flattened surface where the magnetic layer and the nonmagnetic layer are flush. This nonmagnetic layer is in contact with the magnetic layer via its bottom part and/or side part, and therefore the magnetic material might migrate from the magnetic layer to the nonmagnetic layer. To prevent such migration, a polysiloxane-based material is used (Patent Document 2).

On the other hand, a styrene-based polymer having a photocuring portion is disclosed (Patent Document 3).

PRIOR ART DOCUMENTS

Patent Documents

Patent Document 1: Japanese Patent Application Publication No. 2005-100496 (JP 2005-100496 A)
Patent Document 2: Japanese Patent Application Publication No. 2009-259370 (JP 2009-259370 A)
Patent Document 3: Japanese Patent Application Publication No. 2010-024330 (JP 2010-024330 A)

SUMMARY OF THE INVENTION

Problem to be Solved by the Invention

An object of the present invention is to provide a filler of a nonmagnetic body, that is, a flattening film forming composition that is used in a method for producing a discrete track medium and/or a bit pattern medium, the method in which fine grooves (several tens of nanometers) are formed on a magnetic body and the grooves are filled with a nonmagnetic material and subjected to photocuring to be flattened, thereby forming tracks in which magnetic body parts and nonmagnetic body parts are alternately formed.

The flattening film forming composition is required to sufficiently fill the fine grooves and not to cause shrink in the filled part at the time of photocuring (at the time of exposure) and at the time of baking after exposure. The filled part is required to prevent a magnetic material such as a cobalt constituent (cobalt, aluminum, zirconium, chromium, nickel, zinc, iron, and ruthenium, for example) from migrating to the filled part (nonmagnetic layer). An object of the present invention is to provide a flattening film forming composition for a hard disk that meets such required properties, and a method for producing a hard disk using the same.

Means for Solving the Problem

The present invention provides: as a first aspect, a flattening film forming composition for a hard disk, characterized by comprising: a photopolymerizable coating material containing at least one polymer selected from the group consisting of a homopolymer that has a divinyl aromatic compound-derived unit structure and a copolymer having the unit structure or containing a mixture of the polymer and a photopolymerizable compound, in which the coating material contains 1% by mole to 90% by mole of vinyl groups per mole of benzene rings;

as a second aspect, the flattening film forming composition according to the first aspect, in which the divinyl aromatic compound is divinylbenzene;

as a third aspect, the flattening film forming composition according to the first or second aspect, in which the photopolymerizable compound is a compound including an acrylate group, a methacrylate group, or a vinyl group;

as a fourth aspect, the flattening film forming composition according to any one of the first to third aspect, in which the copolymer further has an addition polymerizable compound-derived unit structure;

as a fifth aspect, the flattening film forming composition according to any one of the first to fourth aspects, further comprising: a photopolymerization initiator; and a solvent;

as a sixth aspect, a method for producing a hard disk, comprising: a first step of forming projections and recesses on a magnetic body; a second step of coating the projections and recesses with the flattening film forming composition as described in any one of the first to fifth aspect to form a coating; and a third step of flattening the coating by means of etching and exposing a surface of the magnetic body;

as a seventh aspect, the method for producing a hard disk according to the sixth aspect, in which the projections and recesses in the first step is formed by means of a nanoimprint method;

as an eighth aspect, the method according to the sixth or seventh aspect, in which the coating in the second step is formed by a method of radiating light to the flattening film forming composition covering the projections and recesses formed in the first step so as to cure the flattening film forming composition;

as a ninth aspect, the method according to the sixth or seventh aspect, in which the coating in the second step is formed by a method of radiating light to the flattening film forming composition covering the projections and recesses formed in the first step and further performing reflow with heat;

as a tenth aspect, the method for producing a hard disk according to any one of the sixth to ninth aspects, in which the flattening in the third step is performed by means of dry etching;

as an eleventh aspect, the method for producing a hard disk according to the tenth aspect, in which the dry etching uses a halogen-free dry etching gas;

as a twelfth aspect, the method for producing a hard disk according to any one of the sixth to eleventh aspects, further comprising a fourth step of coating the flattened surface of the coating in the third step with a hard substance; and as a thirteenth aspect, the method for producing a hard disk according to the twelfth aspect, in which the hard substance used in the fourth step is diamond-like carbon.

Effects of the Invention

In a method for forming tracks in which magnetic body parts and nonmagnetic body parts are alternately disposed by filling fine grooves formed on the magnetic layer with a nonmagnetic material and etching back the nonmagnetic material, the flattening film forming composition of the present invention can form a film with high flatness because the flattening film forming composition exhibits excellent filling properties when applied as the nonmagnetic material on the magnetic layer and is less likely to cause shrink at the time of photocuring (at the time of exposure) and at the time of baking after exposure.

The flattening film forming composition of the present invention can prevent the magnetic body from partially corroding due to entry of moisture of the atmosphere, and thus can prevent a corroded constituent from migrating to the nonmagnetic layer because it contains a hydrophobic coating material.

The method for producing a hard disk of the present invention can suitably produce a hard disk that is excellent in the surface flatness and in which the magnetic material is less likely to migrate to the nonmagnetic layer.

MODES FOR CARRYING OUT THE INVENTION

Figure 1:
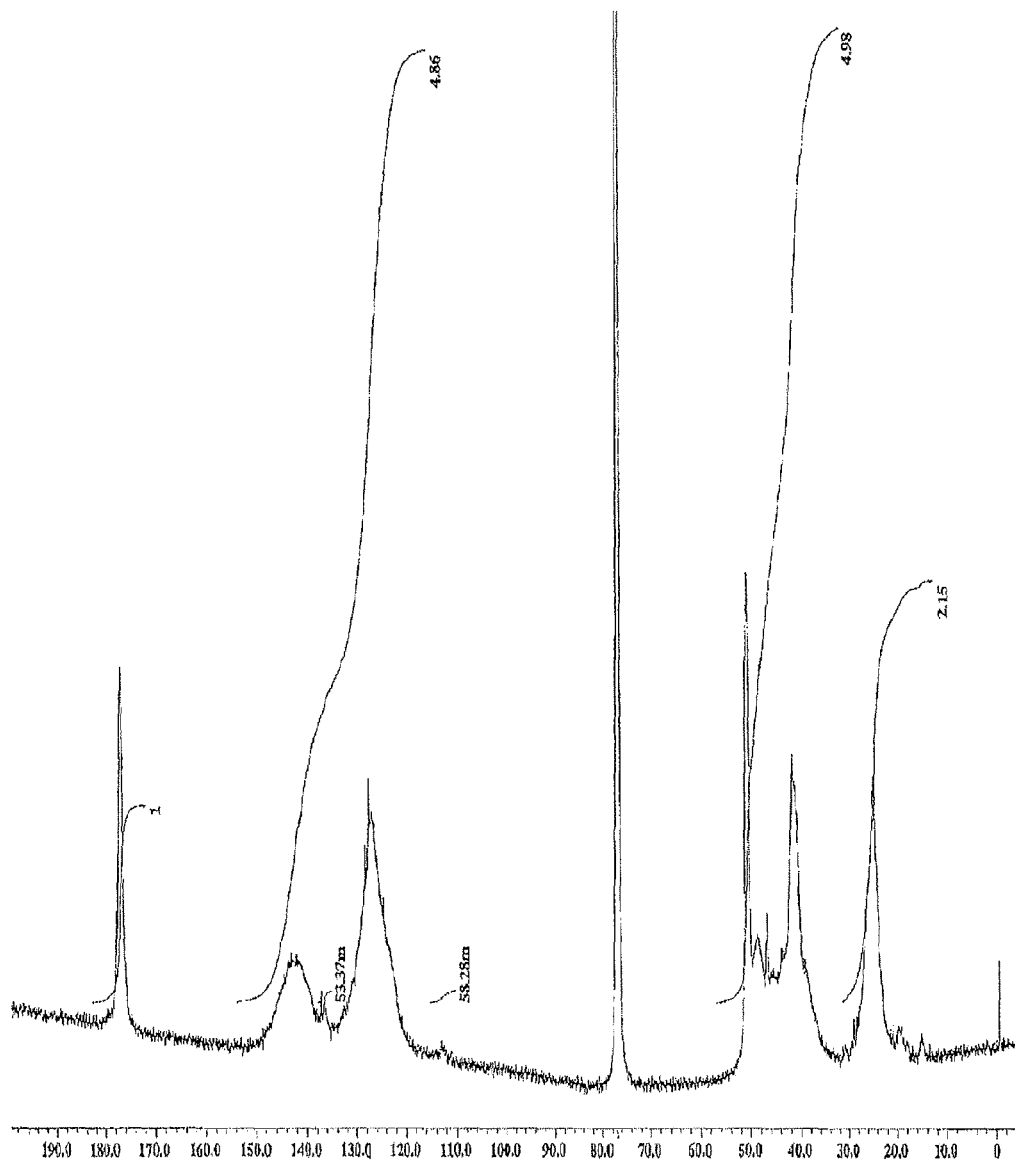
FIG. 1 is a diagram showing a $^{13}$C-NMR spectrum of a polymer obtained in Synthesis Example 1.

A feature of the present invention is apparent in comparison between a conventional composition using an inorganic compound and a composition using an organic compound, as in the present invention, as a composition for filling fine grooves with the flattening film forming composition.

In the case of using a flattening film forming composition containing an inorganic compound, a method has been employed in which the composition is applied onto a substrate having projections and recesses, reflow is performed with heat at a temperature of 200° C. or more, the inorganic coating is shaven by means of CMP and/or wet etching or the like, heat curing is performed, dry etching is performed for flattening, and the surface is coated with diamond-like carbon.

In contrast, in the case using a flattening film forming composition containing an organic compound of the present invention, a method is employed in which the composition is applied onto a substrate having projections and recesses, exposure is performed, heating after the exposure is performed as needed, dry etching is performed for flattening, and the surface is coated with diamond-like carbon.

In the case of using an inorganic material (polysiloxane, for example), the inorganic coating part is removed by means of CMP and/or wet etching, and etchback is performed by means of dry etching for flattening. The etchback of the inorganic material is efficiently performed usually using a fluorine-based gas. However, such a fluorine-based gas is known to generate hydrogen fluoride (HF) during the etching, which causes the magnetic material to corrode. In addition, such a fluorine-based gas might form roughness of the film surface after the etching In contrast, in the present invention, a surface of the magnetic layer having projections and recesses formed thereon is coated with the flattening film forming composition that contains a nonmagnetic body of an organic compound by means of an application method, and etchback is then performed using a halogen-free gas (oxygen-containing gas, for example). This etchback of the nonmagnetic layer forms a flattened surface in which the magnetic layer and the nonmagnetic layer are alternately disposed. In this process, the nonmagnetic layer is etched with an oxygen-containing gas while the magnetic layer is not affected. Specifically, no problem occurs such as the corrosion in the etchback using a fluorine-based gas.

Thus, the filling part of the nonmagnetic layer of the present invention can prevent a magnetic material such as a cobalt constituent from migrating to the nonmagnetic layer (called cobalt corrosion), which prevents both the magnetic layer and the nonmagnetic layer from being altered to a magnetic body to be mixed in the tracks.

The following explains the configuration of the composition of the present invention providing such characteristic effects.

The present invention provides a flattening film forming composition for a hard disk. The flattening film forming composition is characterized by comprising a photopolymerizable coating material containing at least one polymer selected from the group consisting of a homopolymer that has a divinyl aromatic compound-derived unit structure and a copolymer having the unit structure or containing a mixture of the polymer and a photopolymerizable compound. In the flattening film forming composition, the coating material contains 1% by mole to 90% by mole of vinyl groups per mole of benzene rings. Containing 1% by mole to 90% by mole of vinyl groups per mole of benzene rings means containing 1 mol to 90 mol of vinyl groups per 100 mol of benzene rings.

The flattening film forming composition further comprises a photopolymerization initiator and a solvent (organic solvent), and can contain a surfactant, a photosensitizer, and a ultraviolet absorber as needed.

The solid content of the flattening film forming composition can be 0.01% by mass to 20% by mass, or 0.1% by mass to 10% by mass, or 0.1% by mass to 5% by mass, Here, the solid content means the rate of a component in the flattening film forming composition excluding the solvent, which is solidified through photocuring (and heating after exposure as needed).

The photopolymerizable coating material in the flattening film forming composition may contain at least one polymer selected from the group consisting of a homopolymer that has a divinyl aromatic compound-derived unit structure and a copolymer having the unit structure, and may contain a mixture of the polymer and a photopolymerizable compound.

The coating material contains 1% by mole to 90% by mole, or 1% by mole to 60% by mole, or 1% by mole to 40% by mole, or 1% by mole to 20% by mole, or 1% by mole to 10% by mole, or 40% by mole to 90% by mole of vinyl groups per mole of benzene rings.

The polymer can contain 1% by mole to 90% by mole, or 1% by mole to 60% by mole, or 1% by mole to 40% by mole, or 1% by mole to 20% by mole, or 1% by mole to 10% by mole of vinyl groups per mole of benzene rings.

The mixture of the polymer and a photopolymerizable compound can contain 1% by mole to 90% by mole, or 1% by mole to 60% by mole, or 1% by mole to 40% by mole, or 1% by mole to 20% by mole, or 1% by mole to 10% by mole, or 40% by mole to 90% by mole of vinyl groups per mole of benzene rings.

A divinyl aromatic compound has two vinyl groups that can be involved with polymerization. The polymer used in the present invention can have both a unit structure having two vinyl groups involved with polymerization and a unit structure having one vinyl group involved with polymerization and the other vinyl group remaining unreacted. Combining the vinyl group remaining unreacted and a vinyl group of the photopolymerizable compound, the photopolymerizable coating material contains 1% by mole to 90% by mole of vinyl groups with respect to benzene rings.

The homopolymer that has a divinyl aromatic compound-derived unit structure or the copolymer having the unit structure preferably has a weight-average molecular weight ranging from 5000 to 200,000, or 5100 to 200,000, or 5500 to 100,000.

The homopolymer or copolymer may include a low-molecular oligomer polymer as long as it belongs to the molecular weight range above.

The coating material in the solid content can range from 50% by mass to 99% by mass, 60% by mass to 95% by mass, or 70% by mass to 90% by mass.

The divinyl aromatic compound may be a divinylbenzene (o-divinylbenzene, m-divinylbenzene, p-divinylbenzene), a diisopropenylbenzene (for example, 1,2-diisopropenylbenzene, 1,3-diisopropenylbenzene, and 1,4-diisopropenylbenzene), a divinylnaphthalene (for example, 1,3-divinylnaphthalene, 1,8-divinylnaphthalene, 1,4-divinylnaphthalene, 1,5-divinylnaphthalene, 2,3-divinylnaphthalene, 2,7-divinylnaphthalene, and 2,6-divinylnaphthalene), a divinylbiphenyl (for example, 4,4'-divinylbiphenyl, 4,3'-divinylbiphenyl, 4,2'-divinylbiphenyl, 3,2'-divinylbiphenyl, 3,3'-divinylbiphenyl, 2,2'-divinylbiphenyl, and 2,4-divinylbiphenyl), and a derivative thereof but is not limited thereto. These divinyl aromatic compounds may be used singly or in combination of two or more of them.

Divinylbenzene is particularly preferable for the divinyl aromatic compound of the present invention.

In the case of the mixture of at least one polymer selected from the group consisting of a homopolymer that has a divinyl aromatic compound-derived unit structure and a copolymer having the unit structure and the photopolymerizable compound, the ratio between the polymer and the photopolymerizable compound for use can be 100 parts by weight:10 parts by weight to 300 parts by weight, or 100 parts by weight:50 parts by weight to 200 parts by weight.

The photopolymerization initiator for use in the solid content can range from 0.5% by mass to 30% by mass, or 5% by mass to 30% by mass, or 10% by mass to 30% by mass.

An additive serving as the surfactant in the solid content can be used within a range from 0.0001% by mass to 1% by mass or 0.001% by mass to 0.5% by mass.

An additive serving as the photosensitizer in the solid content can be used within a range from 0.01% by mass to 5% by mass or 0.1% by mass to 1% by mass.

An additive serving as the ultraviolet absorber in the solid content can be used within a range from 0.01% by mass to 5% by mass or 0.1% by mass to 1% by mass.

The polymer having a divinyl aromatic compound-derived unit structure can be a copolymer further having a unit structure derived from an addition polymerizable compound such as a vinyl-based compound. In other words, in addition to the divinyl aromatic compound, an addition polymerizable compound such as a vinyl-based compound can be copolymerized. The addition polymerizable compound can be used within 300 parts by weight or within 200 parts by weight with respect to 100 parts by weight of the divinyl aromatic compound.

Examples of the addition polymerizable compound include an acrylic ester compound, a methacrylic ester compound, an acrylamide compound, a methacrylamide compound, a vinyl compound, a styrene compound, a maleimide compound, and acrylonitrile.

Examples of the acrylic ester compound include methyl acrylate, ethyl acrylate, n-hexyl acrylate, isopropyl acrylate, cyclohexyl acrylate, benzyl acrylate, phenyl acrylate, anthrylmethyl acrylate, 2-hydroxyethyl acrylate, 3-chloro-2-hydroxypropyl acrylate, 2-hydroxypropyl acrylate, 2,2,2-trifluoroethyl acrylate, 2,2,2-trichloroethyl acrylate, 2-bromoethyl acrylate, 4-hydroxybutyl acrylate, 2-methoxyethyl acrylate, tetrahydrofurfuryl acrylate, 5-acryloyloxy-6-hydroxynorbornene-2-carboxylic-6-lactone, 3-acryloxypropyltriethoxysilane, and glycidyl acrylate, and further include styryl acrylate and alkenyl acrylate. The number of carbon atoms of the alkenyl group can be 2 to 10, for example. Examples thereof include vinyl acrylate, allyl acrylate, 3-butenyl acrylate, 4-pentyl acrylate, and 5-hexyl acrylate.

Examples of the methacrylic ester compound include methyl methacrylate, ethyl methacrylate, n-hexyl methacrylate, isopropyl methacrylate, cyclohexyl methacrylate, benzyl methacrylate, phenyl methacrylate, anthrylmethyl methacrylate, 2-hydroxyethyl methacrylate, 2-hydroxypropyl methacrylate, 2,2,2-trifluoroethyl methacrylate, 2,2,2-trichloroethyl methacrylate, 2-bromoethyl methacrylate, 4-hydroxybutyl methacrylate, 2-methoxyethyl methacrylate, tetrahydrofurfuryl methacrylate, 5-methacryloyloxy-6-hydroxynorbornene-2-carboxylic-6-lactone, 3-methacryloxypropyltriethoxysilane, glycidyl methacrylate, 2-phenylethyl methacrylate, hydroxyphenyl methacrylate, and bromophenyl methacrylate, and further include styryl(meth)acrylate and alkenyl(meth)acrylate. The number of carbon atoms of the alkenyl group can be 2 to 10, for example. Examples thereof include vinyl(meth)acrylate, allyl(meth)acrylate, 3-butenyl(meth)acrylate, 4-pentyl(meth)acrylate, and 5-hexyl(meth)acrylate.

Examples of the acrylamide compound include acrylamide, N-methylacrylamide, N-ethylacrylamide, N-benzylacrylamide, N-phenylacrylamide, N,N-dimethylacrylamide, and N-anthrylacrylamide.

Examples of the methacrylamide compound include methacrylamide, N-methylmethacrylamide, N-ethylmethacrylamide, N-benzylmethacrylamide, N-phenylmethacrylamide, N,N-dimethylmethacrylamide, and N-anthrylacrylamide.

Examples of the vinyl compound include vinyl alcohol, 2-hydroxyethyl vinyl ether, methyl vinyl ether, ethyl vinyl ether, benzyl vinyl ether, vinyl acetic acid, vinyl trimethoxysilane, 2-chloroethyl vinyl ether, 2-methoxyethyl vinyl ether, vinyl naphthalene, and vinyl anthracene.

Examples of the styrene compound include styrene, hydroxystyrene, chlorostyrene, bromostyrene, methoxystyrene, cyanostyrene, and acetylstyrene.

Examples of the maleimide compound include maleimide, N-methylmaleimide, N-phenylmaleimide, N-cyclohexylmaleimide, N-benzylmaleimide, and N-hydroxyethylmaleimide.

Examples of the photopolymerizable compound include a compound including an acrylate group, a methacrylate group, or a vinyl group.

In the mixture of at least one polymer selected from the group consisting of a homopolymer that has a divinyl aromatic compound-derived unit structure and a copolymer having the unit structure and a photopolymerizable compound, examples of the photopolymerizable compound include divinylbenzene, styryl(meth)acrylate, and alkenyl (meth)acrylate. The number of carbon atoms of the alkenyl group can be 2 to 10, for example. Examples thereof include vinyl(meth)acrylate, allyl(meth)acrylate, 3-butenyl(meth)acrylate, 4-pentyl(meth)acrylate, and 5-hexyl(meth)acrylate.

Examples of the photopolymerizable compound include poly(meth)acrylate, and examples of a (meth)acrylate therein include a compound having the (meth)acrylate group above. They may also have a substituent such as a hydroxy group.

Examples of the polymer containing a divinylbenzene are as follows.

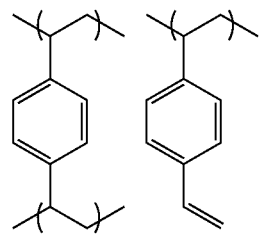

Formula (1-1)

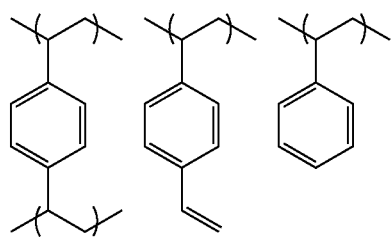

Formula (1-2)

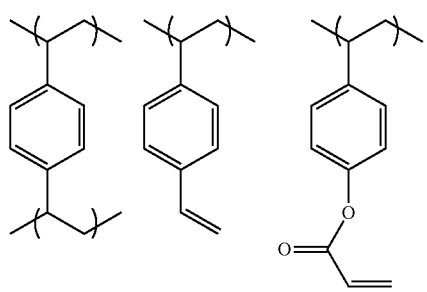

Formula (1-3)

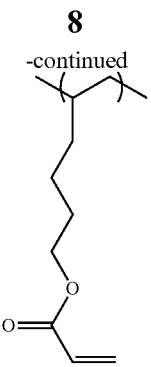

Formula (1-4)

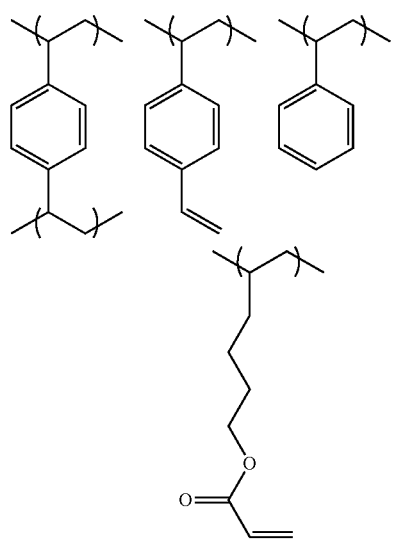

Formula (1-5)

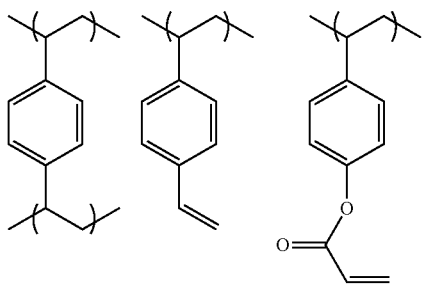

Formula (1-6)

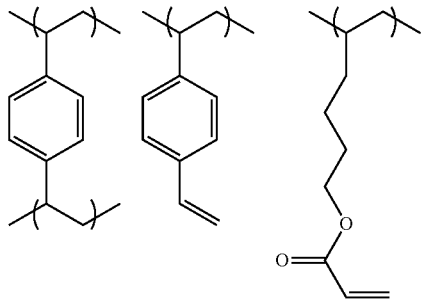

Examples of the mixture of at least one polymer selected from the group consisting of a homopolymer that has a divinyl aromatic compound-derived unit structure and a copolymer having the unit structure and the photopolymerizable compound are as follows.

Formula (2-1)
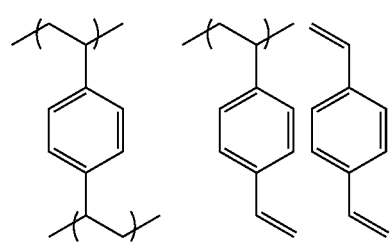
Formula (2-2)
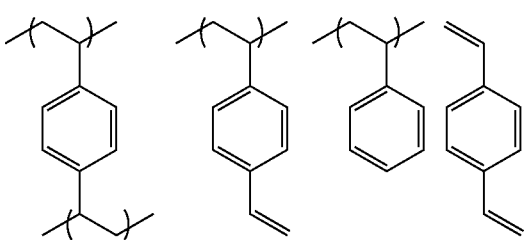
Formula (2-3)
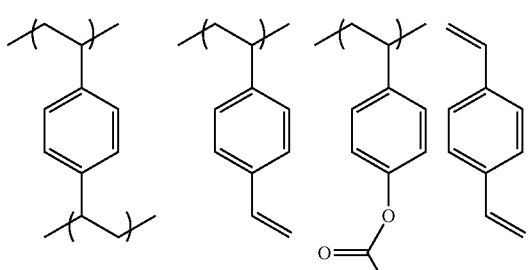
Formula (2-4)
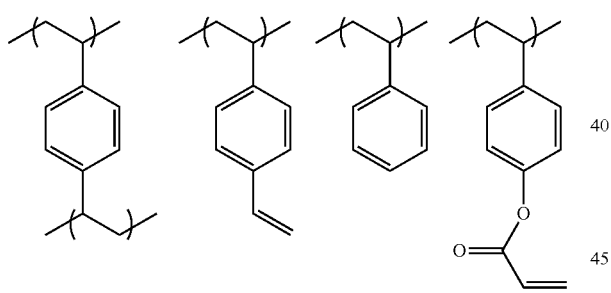
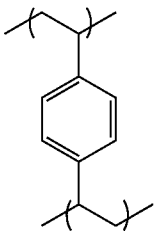
Formula (2-5)
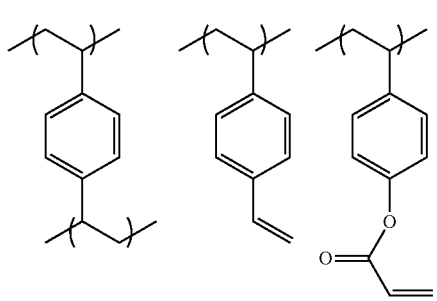
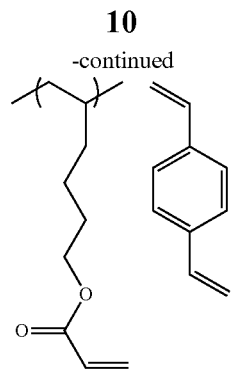
Formula (2-6)
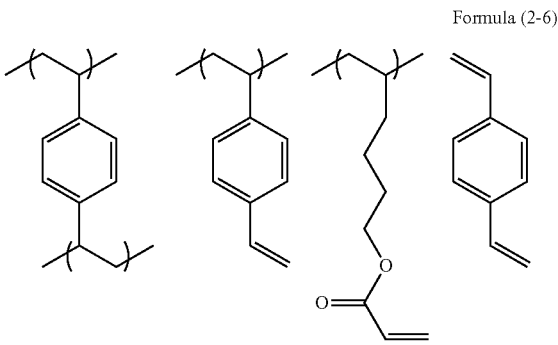
Formula (2-7)
Formula (2-8)
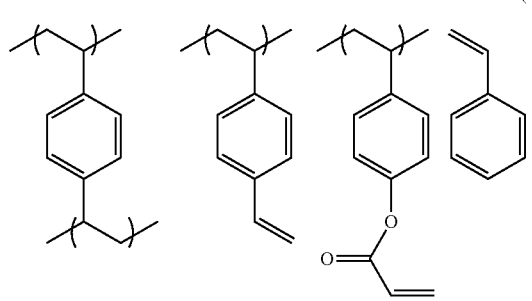
Formula (2-9)

Formula (2-10)
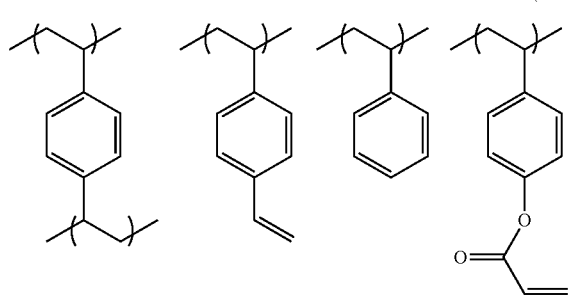
Formula (2-11)
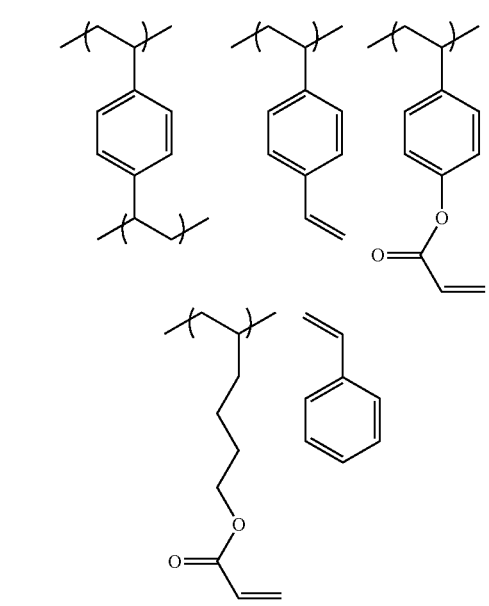
Formula (2-12)
Formula (2-14)
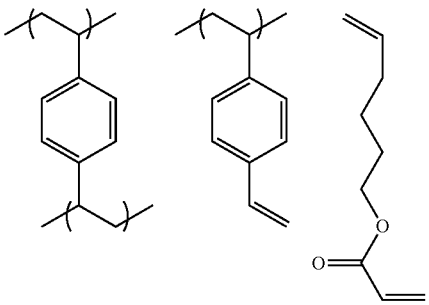
Formula (2-15)
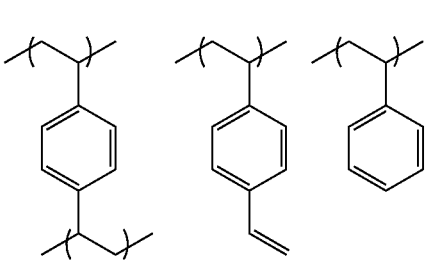
Formula (2-16)
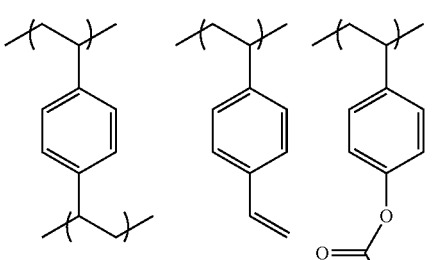
Formula (2-17)
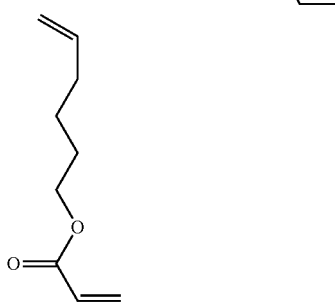

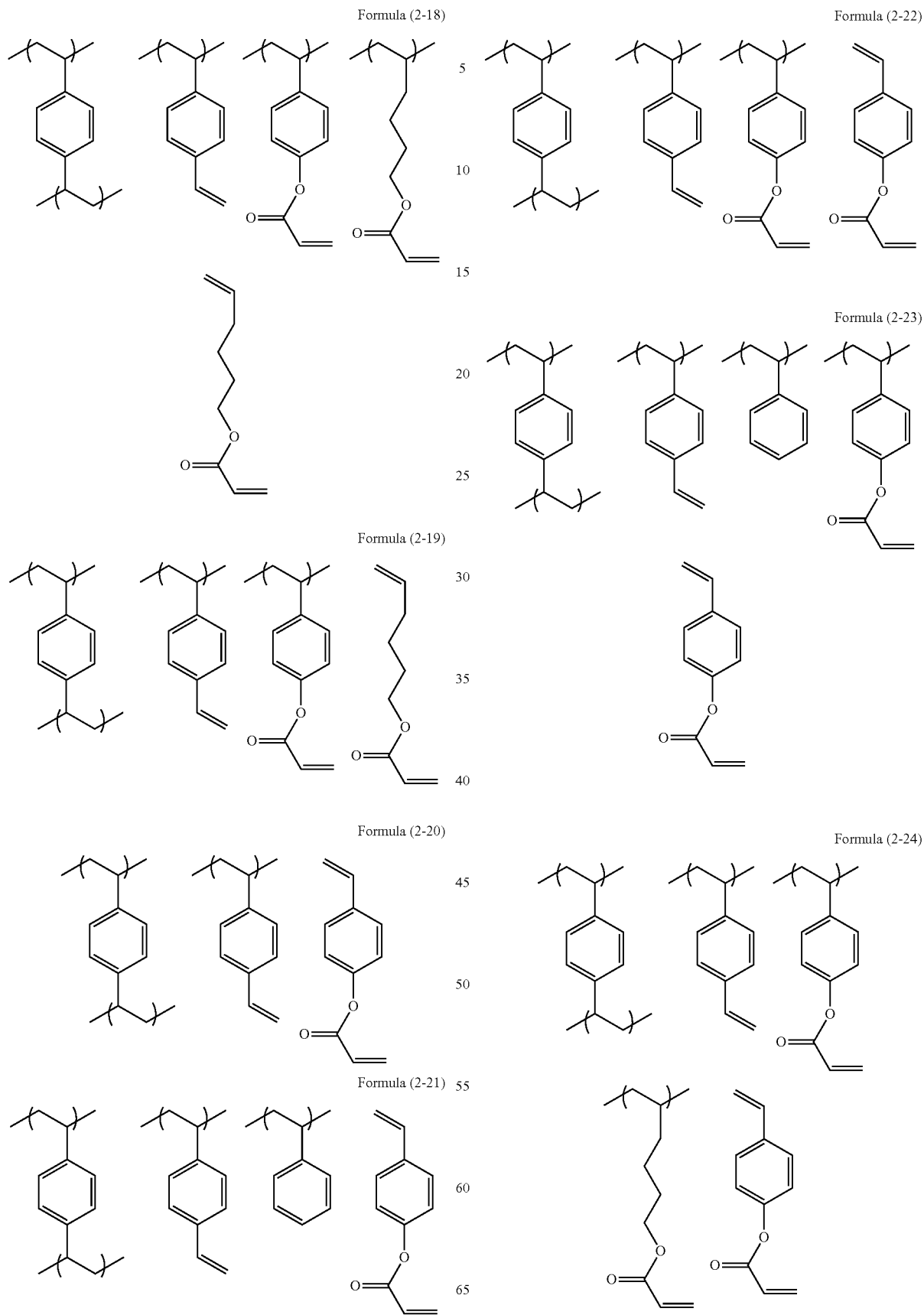

Formula (2-25)

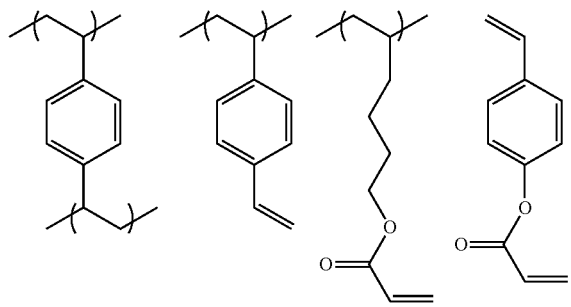

Formula (2-26)

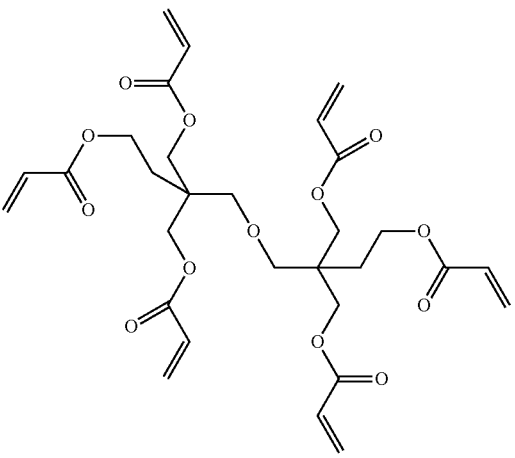

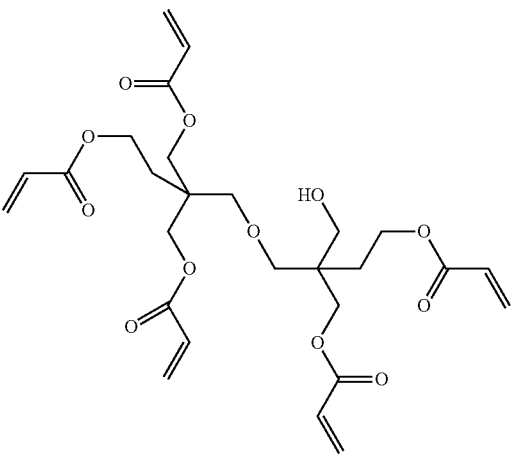

Formula (2-27)

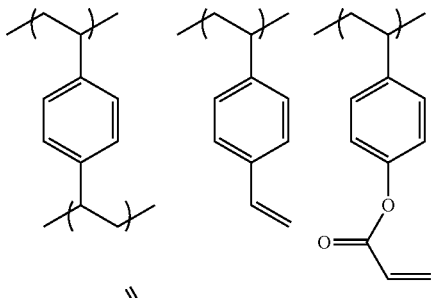

The photopolymerization initiator in the flattening film forming composition of the present invention is not particularly limited as long as it can start polymerization of the photopolymerizable group by mean of light irradiation. It is possible to use a compound that generates an acid (Brønsted acid or Lewis acid), a base, radicals, or cations through light irradiation. It is particularly preferable to use a photo-radical polymerization initiator.

Examples of the photo-radical polymerization initiator include: IRGACURE (trade name) 369 (Formula 3-1, manufactured by BASF Japan Ltd., 2-benzyl-2-dimethylamino-1-(4-morpholinophenyl)butanone-1);

IRGACURE (trade name) 500 (Formula 3-2, manufactured by BASF Japan Ltd., a mixture of 1-hydroxycyclohexylphenylketone and benzophenone);

IRGACURE (trade name) 819 (Formula 3-3, manufactured by BASF Japan Ltd., bis(2,4,6-trimethylbenzoin)-phenylphosphine oxide);

IRGACURE (trade name) 651 (Formula 3-4, manufactured by BASF Japan Ltd., 2,2-dimethoxy-1,2-diphenylethan-1-one);

IRGACURE (trade name) 184 (Formula 3-5, manufactured by BASF Japan Ltd., 1-hydroxycyclohexylphenyl ketone);

DAROCUR (trade name) 1173 (Formula 3-6, manufactured by BASF Japan Ltd., 2-hydroxy-2-methyl-1-phenyl-propane-1-one);

IRGACURE (trade name) 2959 (Formula 3-7, manufactured by BASF Japan Ltd., 1-(4-(2-hydroxyethoxy)phenyl)-2-hydroxy-2-methyl-1-propan-1-one);

IRGACURE (trade name) 127 (Formula 3-8, manufactured by BASF Japan Ltd., 2-hydroxy-1-(4-(4-(2-hydroxy-2-methyl-propionyl)-benzyl)-phenyl)-2-methyl-propan-1-one);

IRGACURE (trade name) 907 (Formula 3-9, manufactured by BASF Japan Ltd., 2-methyl-1-(4-methylthiophenyl)-2-morpholinopropan-1-one);

IRGACURE (trade name) 379 (Formula 3-10, manufactured by BASF Japan Ltd., 2-(dimethylamino)-2-(4-(methylphenyl)methyl)-1-(4-(4-morpholinyl)phenyl)-1-butanone);

IRGACURE (trade name) OXE01 (Formula 3-11, manufactured by BASF Japan Ltd., 1,2-octanedione 1,4-(4-phenylthio)-2-(O-benzoyloxime)); and Lucirin TPO (trade name) (Formula 3-12, manufactured by BASF Japan Ltd., 2,4,6-trimethylbenzoyl-diphenylphosphine oxide).

Formula (3-1)

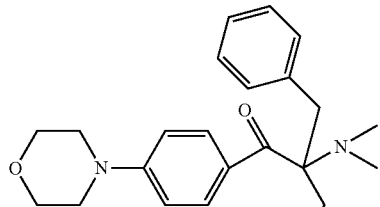

Formula (3-2)

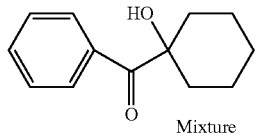

Mixture

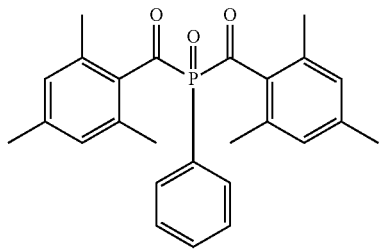

Formula (3-3)

Formula (3-4)

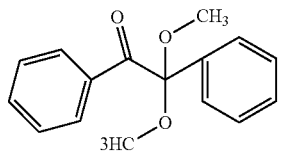

Formula (3-5)

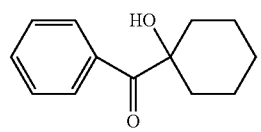

Formula (3-6)

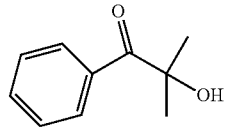

Formula (3-7)

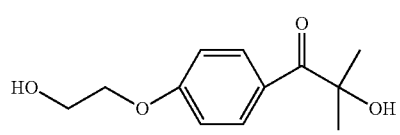

Formula (3-8)

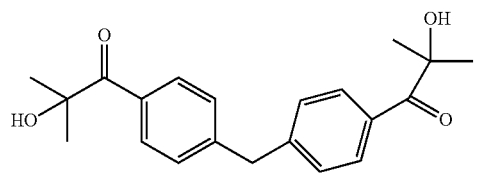

Formula (3-9)

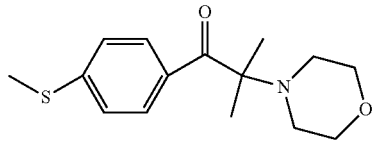

Formula (3-10)

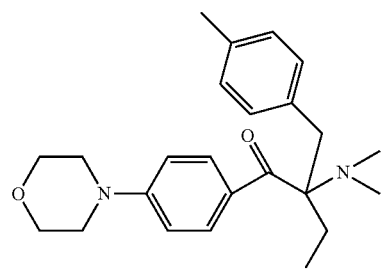

Formula (3-11)

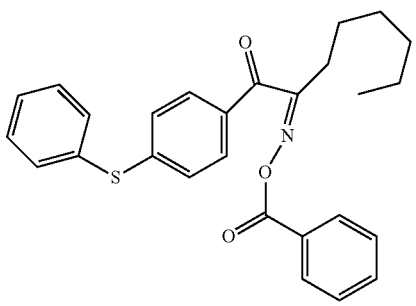

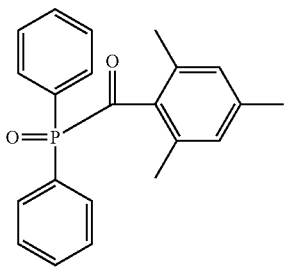

Formula (3-12)

The flattening film forming composition of the present invention can contain a surfactant.

Examples of the surfactant include non-ionic surfactants such as the following polyoxyethylene alkyl ethers such as polyoxyethylene lauryl ether, polyoxyethylene stearyl ether, polyoxyethylene cetyl ether, and polyoxyethylene oleyl ether; polyoxyethylene alkylarylethers such as polyoxyethylene octyl phenol ether and polyoxyethylene nonyl phenol ether; block copolymers of polyoxyethylene and polyoxypropylene; sorbitan fatty acid esters such as sorbitan monolaurate, sorbitan monopalmitate, sorbitan monostearate, sorbitan monooleate, sorbitan trioleate, and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate. Examples of the surfactant also include fluorochemical surfactants such as the following: Eftop (trade name) EF301, EF303, and EF352 (manufactured by Tohkem Products Corporation); MEGAFAC (trade name) F-553, F-554, F171, F173, R-08, R-30, and R-30-N (manufactured by Dainippon Ink and Chemicals, Inc.); FLUORAD FC430 and FC431 (manufactured by Sumitomo 3M Limited); and Asahi Guard (trade name) AG710, and Surflon S-382, SC101, SC102, SC103, SC104, SC105, and SC106 (manufactured by ASAHI GLASS CO., LTD.), and organosiloxane polymer KP341 (manufactured by Shin-Etsu Chemical Co., Ltd.). These surfactants may be used singly or in a combination of two or more of them.

The flattening film forming composition of the present invention can contain a photosensitizer.

Examples of the photosensitizer include a thioxanthene-based, a xanthene-based, a ketone-based, a thiopyrylium salt-based, a base styryl-based, a merocyanine-based, a 3-substituted coumarin-based, a 3,4-substituted coumarin-based, a cyanine-based, an acridine-based, a thiazine-based, a phenothiazine-based, an anthracene-based, a coronene-based, a benzanthracene-based, a perylene-based, a merocyanine-based, a ketocoumarin-based, a fumarin-based, and a borate-based.

The photosensitizers can be used singly or in combination of two or more of them. The photosensitizer can be used to control the wavelength in a UV region.

Examples of the ultraviolet absorber include TINUVIN (registered trademark) PS, TINUVIN 99-2, TINUVIN 109, TINUVIN 328, TINUVIN 384-2, TINUVIN 400, TINUVIN 405, TINUVIN 460, TINUVIN 477, TINUVIN 479, TINUVIN 900, TINUVIN 928, TINUVIN 1130, TINUVIN 111FDL, TINUVIN 123, TINUVIN 144, TINUVIN 152, TINUVIN 292, TINUVIN 5100, TINUVIN 400-DW, TINUVIN 477-DW, TINUVIN 99-DW, TINUVIN 123-DW, TINUVIN 5050, TINUVIN 5060, and TINUVIN 5151 (manufactured by BASF Japan Ltd.).

The ultraviolet absorbers can be used singly or in combination two or more of them. The ultraviolet absorber can be used to control the cure rate of the outermost surface of a film during photocuring, which may improve the photocuring property of the thin film.

The flattening film forming composition of the present invention can contain the coating material, the photopolymerization initiator, and an organic solvent. Examples of the organic solvent include toluene, p-xylene, o-xylene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl n-butyl ketone, cyclohexanone, ethyl acetate, isopropyl acetate ketone, n-propyl acetate, isobutyl acetate, n-butyl acetate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-octanol, ethylene glycol, hexylene glycol, trimethylene glycol, 1-methoxy-2-butanol, diacetone alcohol, furfuryl alcohol, tetrahydrofurfuryl alcohol, propylene glycol, benzyl alcohol, isopropyl ether, 1,4-dioxane, N,N-dimethylformamide, N,N-dimethylacetamide, N-methylpyrrolidone, 1,3-dimethyl-2-imidazolidinone, dimethylsulfoxide, and N-cyclohexyl-2-pyrrolidine.

The present invention provides a method for producing a hard disk, the method comprising: a first step of forming projections and recesses on a magnetic body; a second step of coating the projections and recesses with the flattening film forming composition as described in any one of the first to fourth aspect and forming a coating; and a third step of flattening the coating by means of etching and exposing a surface of the magnetic body.

In the first step of forming projections and recesses on a magnetic body, a track pattern is formed on the magnetic body by means of a photo-nanoimprint or heat-nanoimprint method, for example. The pattern is used to process a surface of the magnetic body and form projections and recesses by means of dry etching. For the dry etching, an oxygen-based gas, an argon-based gas, and a fluorine-based gas can be used as an etching gas. Oxygen and argon are more preferable. Examples of the fluorine-based gas include tetrafluoromethane ($CF_4$), perfluorocyclobutane ($C_4F_8$), perfluoropropane ($C_3F_8$), trifluoromethane, and difluoromethane ($CH_2F_2$). In the case of performing dry etching using a fluorine-based gas, HF might be generated during the etching and corrode the magnetic body.

In the second step, the surface of the magnetic body with the projections and recesses formed thereon is coated with (subjected to application of) the flattening film forming composition of the present invention.

The second step of coating with the flattening film forming composition to form a coating is a method of irradiating the coating with light to cure it.

The application can be performed by means of, for example, spin coating, dipping, flow coating, ink-jet coating, spraying, bar coating, gravure coating, roll coating, transfer printing, brush application, blade coating, and air-knife coating.

Spin coating is preferable. For example, spin coating can be performed at a spin speed of 10 to 10,000 rpm for 3 to 60 seconds.

The film thickness can be in a range of 5 nm to 10 µm, and particularly in a range of 5 nm to 100 nm because the projections and recesses have several tens of nanometers.

The flattening film forming composition is applied to the magnetic body having the surface with the projections and recesses formed, whereby the flattening film forming composition fills the surface with the projections and recesses. The surface can be faced with the flattening film forming composition to form a coating. This coating of the flattening film forming composition is cured by means of photocuring.

The second step can include a drying step in order to vaporize a solvent.

A drying device is not particularly limited. For example, a hotplate, an oven, and a furnace may be used to perform baking in an appropriate atmosphere, namely the air, an inert gas such as nitrogen, or a vacuum. This can provide a flattening film (coating) having a uniform film-forming surface.

The drying temperature can be 40° C. to 150° C. in order to vaporize the solvent but is not particularly limited.

The light radiation can be performed using a light having a wavelength of 150 nm to 1000 nm, or 200 nm to 700 nm, or 300 nm to 600 nm, for example. The light radiation can be performed using, for example, an extra-high pressure mercury lamp, a flash UV lamp, a high pressure mercury lamp, a low pressure mercury lamp, a DEEP-UV lamp, a xenon short arc lamp, a short arc metal halide lamp, a YAG-laser exciting lamp, and a xenon flash lamp. For example, an extra-high pressure mercury lamp can be used to radiate all wavelengths from about 250 nm to 650 nm, which include emission line spectra having peaks of 289 nm, 297 nm, 303 nm, and 313 nm (j line), 334 nm, and 365 nm (i line) in the ultraviolet region and 405 nm (h line), 436 nm (g line), 546 nm, and 579 nm in the visible light region. The amount of radiation is 10 mW/cm$^2$ to 1000 mW/cm$^2$ or 10 mW/cm$^2$ to 200 mW/cm$^2$, for 2 seconds to 100 seconds or 5 seconds to 20 seconds.

After the exposure, post exposure bake can be performed as needed. The post exposure bake is performed at a heating temperature selected as appropriate from 50° C. to 200° C. for a heating time selected as appropriate from 1 minute to 10 minutes.

The material of the magnetic body to which the flattening film forming composition is applied is an alloy of a combination of cobalt, aluminum, zirconium, chromium, nickel, zinc, iron, and ruthenium, for example. The magnetic body may include several nanometers of diamond-like carbon laminated thereon because the magnetic carbon in some cases is likely to corrode in the atmosphere.

In the second step of coating with the flattening film forming composition to form a coating, the coating can be subjected to reflow with heat after the light radiation.

In the second step, reflow with heat is performed on the coating that is formed on the surface of the magnetic body with the projection and recesses formed thereon using the flattening film forming composition of the present invention.

The roughness of the coating after the reflow is suitably 1 nm or less in order to prevent a magnetic head from touching the coating when the magnetic head moves over the coating.

A drying device is not particularly limited. For example, a hotplate, an oven, and a furnace may be used to perform baking in an appropriate atmosphere, namely the air, an inert gas such as nitrogen, or a vacuum. This can provide a coating having a uniform surface for film formation.

The drying temperature can be, for example, 50° C. to 200° C. in order to perform reflow on the coating but is not particularly limited.

In the third step, dry etching is performed on the surface covered with the coating to expose the surface of the magnetic body, whereby the surfaces of the magnetic body and the coating are flattened. An etching gas used here is halogen-free oxygen or a gas containing oxygen.

Thus, grooves of a nonmagnetic body (grooves filled with the flattening film of the present invention) are formed on the surface (layer) of the magnetic body as a track pattern. The surfaces (layers) of the magnetic body and the nonmagnetic body form a flat surface.

The present invention can further comprise a fourth step of coating the flattened surface with a hard substance having a several tens of nanometer thickness by means of evaporation coating. An example of the hard substance is diamond-like carbon.

EXAMPLES

The present invention will be specifically explained using examples and comparative examples below, but is not limited to the examples. Measurement devices used in the examples are as follow.

The film thickness was measured using an variable-angle spectroscopic ellipsometer VASE manufactured by J. A. Woollam Japan Co., Inc.

The atomic force microscope used was Nano Navi L-trace manufactured by SII NanoTechnology Inc. For the cantilever, SI-DF40 (back side AL coated) was used.

The UV irradiation device used was an electrodeless lamp system QRE4016 manufactured by ORC MANUFACTURING CO., LTD., and the illuminance was 20 mW/cm$^2$.

The electron microscope used was S-4800 manufactured by Hitachi High-Technologies Corporation.

The average molecular weight of polymer was measured using HLC-8220 GPC (trade name) manufactured by TOSOH CORPORATION. The columns used were Shodex (registered trademark) KF-804L and KF-805L, and the column temperature was 40° C. The solvent was tetrahydrofuran, and the detector was RI.

The measurement of $^1$H-NMR spectrum and $^{13}$C-NMR spectrum was performed using JNM-ECA700 manufactured by JEOL DATUM LTD. The solvent was CDCl$_3$, and the internal standard was tetramethylsilane.

The quantitative determination of cobalt was performed by means of XPS, using Quantera SXM manufactured by ULVAC-PHI, Inc.

The following abbreviations mean as follows:

DVB: divinylbenzene (DVB-960 manufactured by Nippon Steel Chemical Co., Ltd.);

St: styrene (manufactured by JUNSEI CHEMICAL CO., LTD.); and

MAIB: dimethyl 2,2'-azobisisobutyrate (MAIB manufactured by Otsuka Chemical Co., Ltd., the ten-hour half life temperature is 67° C.).

Synthesis Example 1

Synthesis of HDB1

The pressure in a 500-L reaction chamber was reduced to 10 kPa, and then an operation for nitrogen break was performed three times for nitrogen substitution. Subsequently, 99 kg of toluene (manufactured by Toyo Gosei Co., Ltd, cactus solvent) was charged therein. Steam of 0.2 MPaG was fed into a jacket of the reaction chamber, thereby increasing the temperature in the chamber to 111° C.

Nitrogen was flown into a 140-L dissolution chamber at a flow rate of 3 m³/hour for nitrogen substitution. Subsequently, 5.2 kg (40 mol) of DVB, 7.4 kg (32 mol) of MAIB, and 89 kg of toluene (manufactured by Toyo Gosei Co., Ltd, cactus solvent) were charged therein. Nitrogen was flown therein at a flow rate of 1 m³/hour, thereby preparing a raw material solution.

This raw material solution was dripped into the 500-L reaction chamber under toluene reflux, at a dripping rate of 2 kg/minute using a diaphragm pump, with the temperature in the 500-L reaction chamber kept from being under 110° C. Subsequently, 10 kg of toluene was used to wash the 140-L dissolution chamber and was dripped using the diaphragm pump in a similar way, and thereafter the reaction solution was aged for six hours. Well water (about 15° C.) was then fed into the jacket of the 500-L reaction chamber to cool the reaction solution. The weight-average molecular weight Mw of the obtained reaction solution of polystyrene equivalent was measured by means of GPC, which was 42,000, and the degree of distribution Mw/Mn was 7.1.

The pressure in a 500-L reaction chamber was then reduced to 10 kPa. Hot water of 65° C. was fed into the jacket to distill away 160 kg of toluene. About 48 kg of the condensed reaction solution was then extracted from the 500-L reaction chamber into a plastic container.

The pressure in a reprecipitation chamber of 1000 L was reduced to 10 kPa, and then an operation for nitrogen break was performed three times for nitrogen substitution. Subsequently, 520 kg of methanol (manufactured by MITSUBISHI GAS CHEMICAL COMPANY, INC.) was charged therein. Brine was fed into a jacket of the reprecipitation chamber, thereby decreasing the temperature in the reprecipitation chamber to about 0° C.

Nitrogen was flown into a dripping chamber of 115 L at a flow rate of 3 m³/hour for 10 minutes for nitrogen substitution, and the condensed reaction solution was charged in the dripping chamber. The reaction solution prepared in the dripping chamber was dripped to the methanol in the reprecipitation chamber for one hour, thereby precipitating polymer in slurry. This slurry was subjected to pressure filtration, and a cake was washed using 52 kg of methanol cooled to about 0° C. The cake thus obtained was transferred to a square tray and was dried in a static vacuum dryer at 50° C. and 10 kPa for 20 hours, thereby obtaining 8.18 kg of an objective substance (HDB1) of white powder. The polymer thus obtained corresponded to Formula (I-1).

The weight-average molecular weight Mw of the obtained HDB1 of polystyrene equivalent was measured by means of GPC, which was 48,000, and the degree of distribution Mw/Mn was 3.5.

FIG. 1 illustrates a result of $^{13}$C-NMR for HDB1. As a result, with respect to the peak intensity of 155 ppm to 115 ppm attributed to benzene ring moieties of divinylbenzenes, the peak intensity at 114 ppm and 136 ppm attributed to remaining double bonds (vinyl groups) was 8% by mole with respect to the benzene rings in the polymer.

Synthesis Example 2

Synthesis of HDB2

In a 2-L reaction flask, 396 g of toluene (manufactured by KANTO CHEMICAL CO., INC., the first grade) was charged and stirred for five minutes with nitrogen being fed thereto for nitrogen substitution. The flask was heated for reflux of the toluene (the temperature in the flask was 111° C.).

In a 1-L reaction flask, 21 g of DVB (160 mmol), 17 g of St (160 mmol), 33 g of MAIB (144 mmol), and 396 g of toluene (manufactured by KANTO CHEMICAL CO., INC., the first grade) were charged and stirred for five minutes with nitrogen being fed thereto for nitrogen substitution.

The content of the 1-L reaction flask containing DVB, St, and MAIB was dripped into the toluene at reflux in the 2-L reaction flask, using a dripping pump for 30 minutes. After the dripping, the reaction solution was aged for six hours. The weight-average molecular weight Mw of the obtained reaction solution of polystyrene equivalent was measured by means of GPC, which was 15,000, and the degree of distribution Mw (the weight-average molecular weight)/Mn (the number average molecular weight) was 6.0.

Subsequently, 581 g of toluene was distilled away from this reaction solution using a rotary evaporator. The reaction solution was then added to 2083 g of hexane (manufactured by KANTO CHEMICAL CO., INC, the special grade) cooled to 0° C., thereby precipitating polymer in slurry. This slurry was subjected to filtration under reduced pressure and vacuum drying, thereby obtaining 34 g of an objective substance (HDB2) of white powder. The polymer thus obtained corresponded to Formula (I-2).

The weight-average molecular weight Mw of the obtained HDB2 of polystyrene equivalent was measured by means of GPC, which was 15,000, and the degree of distribution Mw/Mn was 2.8.

Figure 2:
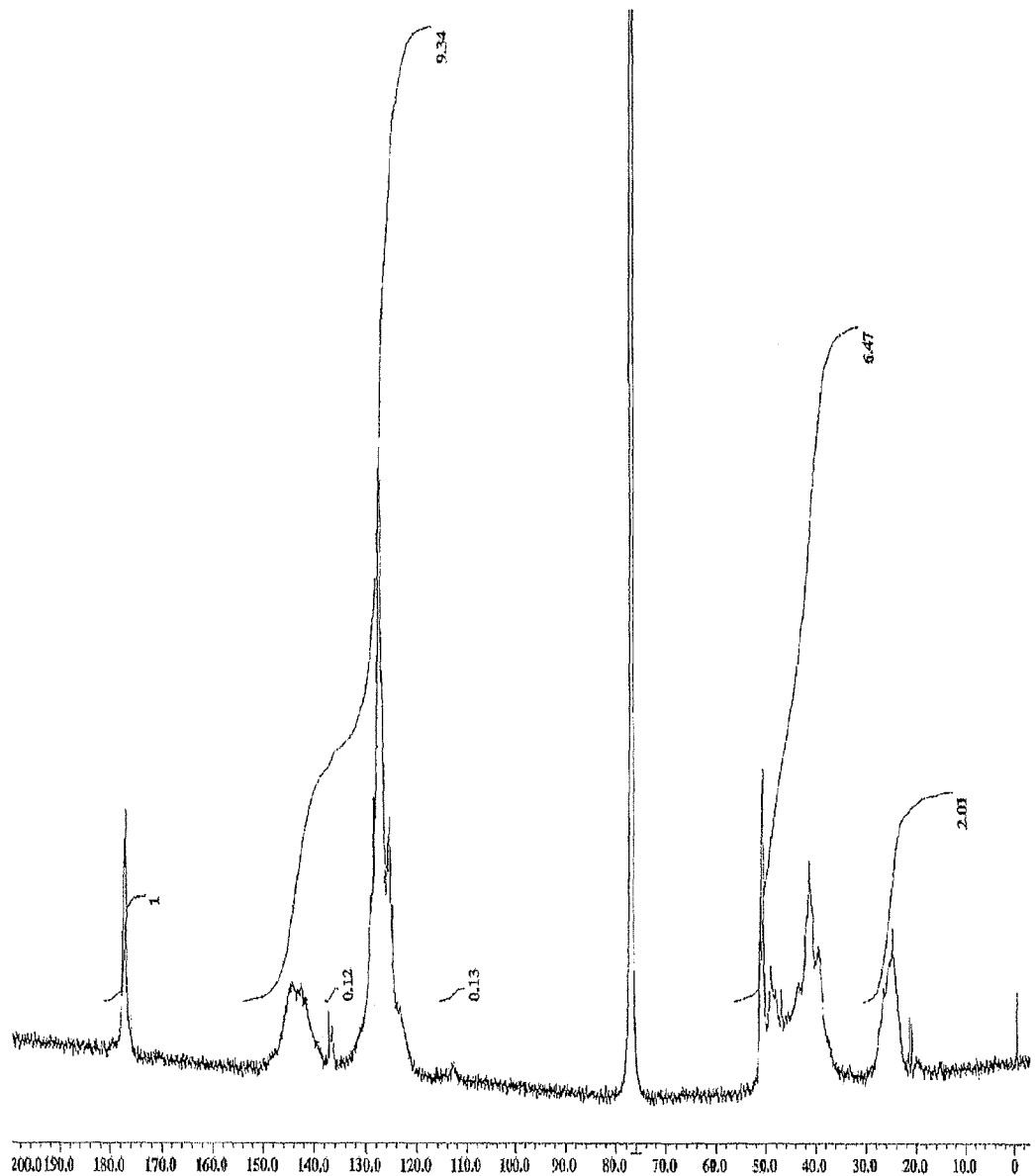
FIG. 2 is a diagram showing a $^{13}$C-NMR spectrum of a polymer obtained in Synthesis Example 2.

FIG. 2 illustrates a result of $^{13}$C-NMR for HDB2. As a result, with respect to the peak intensity of 155 ppm to 118 ppm attributed to benzene ring moieties of divinylbenzenes and benzene ring moieties of styrenes, the peak intensity at 114 ppm and 136 ppm attributed to remaining double bonds (vinyl groups) is 2% by mole with respect to the benzene rings in the polymer.

Example 1

200.00 g of a solution of 1% by mass of HDB1 obtained in Synthesis Example 1 in PGMEA was weighed out and placed in a 500-mL flask having one opening, and 0.40 g of Lucirin TPO (BASF Japan Ltd., a photopolymerization initiator) was added thereto. Further, 0.50 g of a solution of 20% by mass of 3-(trimethoxysilyl)propyl acrylate serving as an adhesion promoter in PGMEA, 2.00 g of a solution of 0.01% by mass of MEGAFAC F-554 (DIC Corporation) serving as a surfactant in PGMEA, and 47.12 g of PGMEA were added thereto. The mixture was stirred at room temperature for 24 hours using a stirrer. Thus, a uniform clear solution (HDB1V) was prepared as a flattening film forming composition for a hard disk.

Example 2

200.00 g of a solution of 1% by mass of HDB2 obtained in Synthesis Example 2 in PGMEA was weighed out and placed in a 500-mL flask having one opening, and 0.40 g of Lucirin TPO (BASF Japan Ltd., a photopolymerization initiator) was added thereto. Further, 0.50 g of a solution of 20% by mass of 3-(trimethoxysilyl)propyl acrylate serving as an adhesion promoter in PGMEA, 2.00 g of a solution of 0.01% by mass of MEGAFAC F-554 (DIC Corporation) serving as a surfactant in PGMEA, and 47.12 g of PGMEA were added thereto. The mixture was stirred at room temperature for 24 hours using a stirrer. Thus, a uniform clear solution (HDB2V) was prepared as a flattening film forming composition for a hard disk.

Example 3

0.20 g of polystyrene (Mw=2000; Wako Pure Chemical Industries, Ltd., a solid polymer) was weighed out and placed in a 500-mL flask having one opening, and 1.20 g of DVB was added thereto.

This coating material is a mixture of polystyrene and divinylbenzene. To this coating material were added 0.50 g of Lucirin TPO (BASF Japan Ltd., a photopolymerization initiator), 0.63 g of a solution of 20% by mass of 3-(trimethoxysilyl)propyl acrylate serving as an adhesion promoter in PGMEA, 2.50 g of a solution of 0.01% by mass of MEGAFAC F-554 (DIC Corporation) serving as a surfactant in PGMEA, and 245.12 g of PGMEA. The mixture was stirred at room temperature for 24 hours using a stirrer. Thus, a uniform clear solution (LSDV) was prepared as a flattening film forming composition for a hard disk. In LSVD, double bonds (vinyl groups) of divinylbenzene moieties are 80% by mole with respect to the benzene rings in LSDV containing a mixture of polystyrene and divinylbenzene monomer.

Comparative Example 1

The coating material above was prepared. This coating material is a mixture of dipentaerythritol hexaacrylate (KAYARAD DPHA (trade name), Nippon Kayaku Co., Ltd., a liquid polyacrylate compound: a mixture of dipentaerythritol pentaacrylate and dipentaerythritol hexaacrylate, the weight-average molecular weight was about 550).

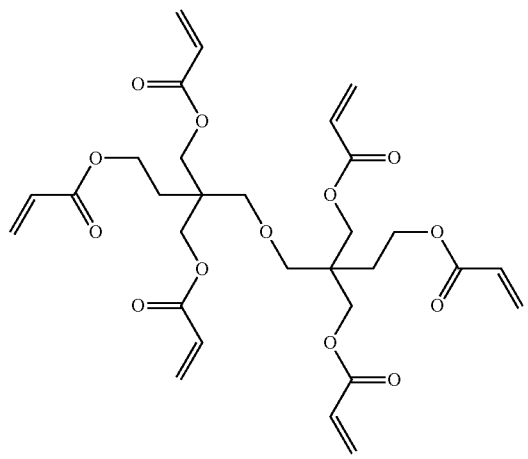

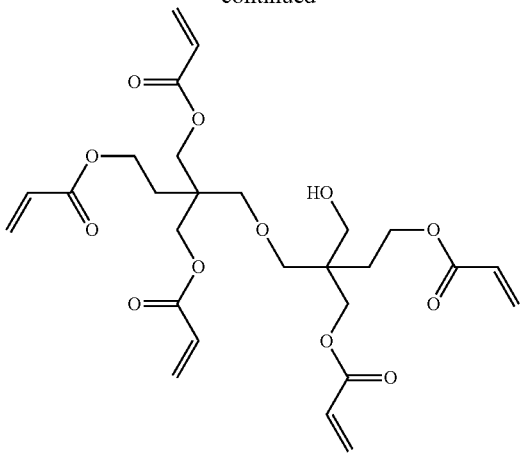

2.00 g of the mixture of dipentaerythritol hexaacrylate, whose product name was KAYARAD DPHA (Nippon Kayaku Co., Ltd.), was weighed out and placed in a 500-mL flask having an eggplant shape, and 0.40 g of Lucirin TPO (BASF Japan Ltd., a photopolymerization initiator) was added thereto. Further, 0.50 g of a solution of 20% by mass of 3-(trimethoxysilyl)propyl acrylate serving as an adhesion promoter in PGMEA, 2.00 g of a solution of 0.01% by mass of MEGAFAC F-554 (DIC Corporation) serving as a surfactant in PGMEA, and 245.12 g of PGMEA were added thereto. The mixture was stirred at room temperature for 24 hours using a stirrer. Thus, a uniform clear solution (RV1) was prepared as a flattening film forming composition for a hard disk.

Comparative Example 2

5.00 g of a solution of 35% of a polymer (Mw=14,300, Mn=5600; Osaka Organic Chemical Industry Ltd., solid polymer) in which styrene and an acrylic acid were copolymerized at 85:15 (a ratio in mole percentage in the copolymer) in PGMEA was weighed out and placed in a 500-mL flask having an eggplant shape.

This coating material was a copolymer of styrene and an acrylic acid below:

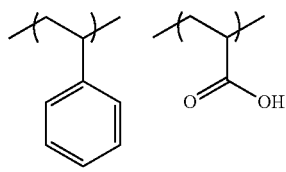

To this coating material were added 0.35 g of GT-401 (Daicel Chemical Industries, Ltd., polyfunctional aliphatic cyclic epoxy resin containing epoxidized butanetetracarboxylic acid tetrakis-(3-cyclohexenylmethyl) modified ε-caprolactone), 0.44 g of a solution of 20% by mass of 3-(trimethoxysilyl)propyl acrylate serving as an adhesion promoter in PGMEA, 1.75 g of a solution of 0.01% by mass of MEGAFAC F-554 (DIC Corporation) serving as a surfactant in PGMEA, and 211.23 g of PGMEA. The mixture was stirred at room temperature for 24 hours using a stirrer. Thus, a uniform clear solution (RV2) was prepared as a flattening film forming composition for a hard disk.

Comparative Example 3

2.00 g of polystyrene (Mw=2000; Wako Pure Chemical Industries, Ltd., a solid polymer) was weighed out and placed in a 500-mL flask having an eggplant shape.

This coating material was polystyrene below:

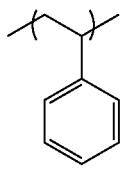

To this coating material were added 0.50 g of a solution of 20% by mass of 3-(trimethoxysilyl)propyl acrylate serving as an adhesion promoter in PGMEA, 2.00 g of a solution of 0.01% by mass of MEGAFAC F-554 (DIC Corporation) serving as a surfactant in PGMEA, and 205.52 g of PGMEA. The mixture was stirred at room temperature for 24 hours using a stirrer. Thus, a uniform clear solution (RV3) was prepared as a flattening film forming composition for a hard disk.

Comparative Example 4

0.20 g of polystyrene (Mw=2000; Wako Pure Chemical Industries, Ltd., a solid polymer) was weighed out and placed in a 500-mL flask having one opening, and 1.80 g of DVB was added thereto.

This coating material is a mixture of polystyrene and divinylbenzene. To this coating material were added 0.50 g of Lucirin TPO (BASF Japan Ltd., a photopolymerization initiator), 0.63 g of a solution of 20% by mass of 3-(trimethoxysilyl)propyl acrylate serving as an adhesion promoter in PGMEA, 2.50 g of a solution of 0.01% by mass of MEGAFAC F-554 (DIC Corporation) serving as a surfactant in PGMEA, and 245.12 g of PGMEA. The mixture was stirred at room temperature for 24 hours using a stirrer. Thus, a uniform clear solution (RV4) was prepared as a flattening film forming composition for a hard disk. In RV4, double bonds (vinyl groups) of divinylbenzene moieties are 120% by mole with respect to the benzene rings in RV4 containing a mixture of polystyrene and divinylbenzene monomer.

<Flattening Properties by Means of Atomic Force Microscope (AFM)>

HDB1V, HDB2V, and LSDV prepared in Examples 1 to 3, respectively, and RV1, RV2, RV3, and RV4 prepared in Comparative Examples 1 to 4, respectively, were concentrated under reduced pressure so as to have a solid content of 4.0% by mass.

A substrate having a structure was spin-coated with a varnish (flattening film forming composition for a hard disk) whose solid content was 4.0% by mass. The substrate having a structure was made of silicon, and had a depth of 100 nm and lines and spaces thereof at equal intervals of 30 nm. The spin coating was performed under the same condition as in the case where a film of 85 nm can be formed on a silicon substrate with no structure.

An AFM was used to measure the average surface roughness ($R_a$) and the maximum surface roughness ($R_{max}$) of a film-forming surface with an embedded structure. The measurement by the AFM was performed in a direction perpendicular to the direction of the lines and spaces, and the measurement range was 5 μm×5 μm.

(Measurement Using Atomic Force Microscope (AFM))

A film of an HDB1 varnish with the solid content of 4.0% by mass (obtained by controlling the solid content of the flattening film forming composition for a hard disk of Example 1 so as to be 4.0% by mass) was formed on a substrate having a structure by means of spin coating. The film after the spin coating was dried using a hotplate at 100° C. for one minute, thereby evaporating the solvent. Subsequently, the film was irradiated with light of an illuminance of 100 mW/cm² for 10 seconds (1000 mJ/cm²), using a UV irradiator (the dominant wavelength was 380 nm) under the atmosphere.

After the light irradiation, the film was baked at 160° C. for one minute using a hotplate, which was a reflow process. The flatness over the structure of the film after the baking was evaluated using an AFM. Table 1 shows the measurement result of the AFM.

A film of an HDB2V varnish with the solid content of 4.0% by mass (obtained by controlling the solid content of the flattening film forming composition for a hard disk of Example 2 so as to be 4.0% by mass) was formed in the same manner as in the case of the HDB1V varnish, and was measured with the AFM. Table 1 shows the measurement result of the AFM.

A film of an LSDV varnish with the solid content of 4.0% by mass (obtained by controlling the solid content of the flattening film forming composition for a hard disk of Example 3 so as to be 4.0% by mass) was formed in the same manner as in the case of the HDB1V varnish, and was measured with the AFM. Table 1 shows the measurement result of the AFM.

A film of an RV1 varnish with the solid content of 4.0% by mass (obtained by controlling the solid content of the flattening film forming composition for a hard disk of Comparative Example 1 so as to be 4.0% by mass) was formed in the same manner as in the case of the HDB1V varnish, and was measured with the AFM. Table 1 shows the measurement result of the AFM.

A film of an RV2 varnish with the solid content of 4.0% by mass (obtained by controlling the solid content of the flattening film forming composition for a hard disk of Comparative Example 2 so as to be 4.0% by mass) was formed on a substrate having a structure by means of spin coating. The film after the spin coating was baked using a hotplate at 200° C. for five minutes under the atmosphere. The film after the baking was measured with an AFM. Table 1 shows the measurement result of the AFM.

A film of an RV3 varnish with the solid content of 4.0% by mass (obtained by controlling the solid content of the flattening film forming composition for a hard disk of Comparative Example 3 so as to be 4.0% by mass) was formed in the same manner as in the case of the RV2 varnish, and was measured with the AFM. Table 1 shows the measurement result of the AFM.

A film of an RV4 varnish with the solid content of 4.0% by mass (obtained by controlling the solid content of the flattening film forming composition for a hard disk of Comparative Example 4 so as to be 4.0% by mass) was formed in the same manner as in the case of the RV2 varnish, and was measured with the AFM. Table 1 shows the measurement result of the AFM.

TABLE 1

Flatness of applied films on substrates having a structure

|  | $R_a$ [nm] | $R_{max}$ [nm] |
|---|---|---|
| Film of HDB1V | 0.103 | 0.424 |
| Film of HDB2V | 0.105 | 0.426 |
| Film of LSDV | 0.105 | 0.421 |
| Film of RV1 | 0.101 | 0.416 |
| Film of RV2 | 0.310 | 1.555 |
| Film of RV3 | 0.488 | 2.130 |
| Film of RV4 | 0.289 | 1.451 |

The result in Table 1 shows that respective films of HDB1V, HDB2V, LSDV, and RV1 had small values of $R_a$ and values of $R_{max}$ being 1 nm or less. Thus, it was found that the structure was sufficiently embedded in the films, which resulted in a good flatness.

In contrast, the respective films of RV2, RV3, and RV4 had values of $R_{max}$ being 1 nm or more. Thus, it was found that they had a large surface roughness. If $R_{max}$ is 1 nm or more, the roughness of the flattening film might form a roughness of diamond-like carbon (DLC) laminated over the flattening material in a post process, which might cause a crash with a head over the hard disk. The distance between the head and the hard disk is required to be 5 nm or less, and it is important that $R_{max}$ is 1 nm or less.

<Co Corrosion Test>

A cobalt corrosion test was conducted with respect to HDB1V, HDB2V, and LSDV prepared in Examples 1 to 3, respectively, and RV1, RV2, and RV3 prepared in Comparative Examples 1 to 3, respectively.

A Si substrate with 200 nm of cobalt sputtered thereon (manufactured by Global Net Corp., a cobalt-coated substrate) was used.

XPS was employed to detect cobalt. The measurement conditions were as follows: the X-ray was AlKa, 1486.6 eV (25 W, 15 kV); the measurement range was 1000 μm×1000 μm; the pass energy was 55.0 eV, 112.0 eV; and the photoelectron taku off angle was 45° with respect to the substrate. The quantification of cobalt by means of XPS provides information from the outermost surface of the film to 10 nm in the film-thickness direction. Cobalt exhibits a peak of around 778.2 eV in XPS.

A film of HDB1V (the flattening film forming composition for a hard disk in Example 1) was formed by means of spin coating on the Si substrate with 200 nm of cobalt sputtered thereon, so as to have a film thickness of 20 nm. The film after the spin coating was dried using a hotplate at 100° C. for one minute, thereby evaporating the solvent. Subsequently, the film was irradiated with light of an illuminance of 100 mW/cm² for 10 seconds (1000 mJ/cm²), using a UV irradiator (the dominant wavelength was 380 nm) under the atmosphere.

After the light irradiation, the film was baked at 160° C. for one minute using a hotplate, which was a reflow process.

The outermost surface of the film after the baking was measured to quantify the cobalt. Subsequently, the same film was left for 120 hours in a thermo-hygrostat with a temperature set to 90° C. and a relative humidity set to 90%. The outermost surface of the film after the constant temperature and constant humidity test was measured by means of XPS to quantify the cobalt. Table 2 shows the measurement result of XPS.

A test with a HDB2V varnish (the flattening film forming composition for a hard disk in Example 2) was performed in the same manner as in the case of the HDB1V varnish, and XPS was measured. Table 2 shows the measurement result of XPS.

A test with an LSDV varnish (the flattening film forming composition for a hard disk in Example 3) was performed in the same manner as in the case of the HDB1V varnish, and XPS was measured. Table 2 shows the measurement result of XPS.

A test with an RV1 varnish (the flattening film forming composition for a hard disk in Comparative Example 1) was performed in the same manner as in the case of the HDB1V varnish, and XPS was measured. Table 2 shows the measurement result of XPS.

A film of RV2 varnish (the flattening film forming composition for a hard disk in Comparative Example 2) was formed by means of spin coating on the Si substrate with 200 nm of cobalt sputtered thereon, so as to have a film thickness of 20 nm. The film after the spin coating was baked using a hotplate at 200° C. for five minutes under the atmosphere. The outermost surface of the film after the baking was measured by means of XPS to quantify the cobalt. Subsequently, the same film was left for 120 hours in a thermo-hygrostat with a temperature set to 90° C. and a relative humidity set to 90%. The outermost surface of the film after the constant temperature and constant humidity test was measured by means of XPS to quantify the cobalt. Table 2 shows the measurement result of XPS.

A test with an RV3 varnish (the flattening film forming composition for a hard disk in Comparative Example 3) was performed in the same manner as in the case of the RV2 varnish, and XPS was measured. Table 2 shows the measurement result of XPS.

The outermost surface of a cobalt substrate without any flattening film applied thereon was measured by means of XPS to qualify the cobalt. Subsequently, the film was left for 120 hours in a thermo-hygrostat with a temperature set to 90° C. and a relative humidity set to 90%. The outermost surface of the cobalt substrate after the constant temperature and constant humidity test was measured by means of XPS to quantify the cobalt. Table 2 shows the measurement result of XPS.

TABLE 2

Quantitative values of cobalt

|  | Before constant temperature/ constant humidity test [% by atom] | After constant temperature/ constant humidity test [% by atom] |
|---|---|---|
| Film of HDB1V | 0.00 | 0.00 |
| Film of HDB2V | 0.00 | 0.00 |
| Film of LSDV | 0.00 | 0.00 |
| Film of RV1 | 0.00 | 0.88 |
| Film of RV2 | 0.01 | 0.71 |
| Film of RV3 | 0.00 | 0.00 |
| Cobalt substrate | 4.87 | 9.54 |

The result in Table 2 shows that the quantitative value of cobalt before the constant temperature and constant humidity test was 0.00% by atom. Thus, it was found that no cobalt existed on the outermost surface of a film immediately after formation. The cobalt substrate tested for reference exhibited very high values of 4.87% by atom before the constant temperature and constant humidity test and 9.54% by atom after the constant temperature and constant humidity test.

The quantitative value of cobalt after the constant temperature and constant humidity test was 0.00% by atom in the films of HDB1V, HDB2V, LSDV, and RV3. Thus, it was found that no cobalt was diffused in the surface of the flattening film. In contrast, the films of RV1 and RV2 exhibited 0.88% by atom and 0.71% by atom, respectively. Thus, it was found that cobalt was diffused in the surface of the flattening film. Although RV2 is a polymer having a polystyrene skeleton, cobalt was detected. This is because RV2 has carboxylic acid as a polar group. It was found that the carboxylic acid serves as Lewis acid and causes the cobalt substrate to corrode.

If the film is used as a nonmagnetic body film of a discrete pattern medium in a hard disk, in which the nonmagnetic body and the magnetic body are magnetically separated, cobalt serving as the magnetic body migrates from the magnetic body to the nonmagnetic body, which causes side write and crosstalk. This is problematic in a reliability test after assembly of a device.

The phenomenon in which a magnetic body is detected in a nonmagnetic body is considered to occur because the cobalt substrate as the magnetic body is ionized by acid, alkali, water vapor, and the like to corrode (corrosion), and the ionized constituent migrates to the nonmagnetic body (migration). Thus, the fact that no cobalt is detected from the surface of the nonmagnetic body after the constant temperature and constant humidity test indicates that the nonmagnetic body material causes no corrosion or migration of the cobalt substrate as the magnetic body. A hard disk with high reliability can be therefore provided.

The flattening film as the nonmagnetic body of a hard disk drive (HDD) is required to have a flatness of the organic film surface after embedding a structure of 1 nm or less and to prevent the corrosion and migration of cobalt after the constant temperature and constant humidity test. For this reason, it was found that the films of HDB1V, HDB2V, and LSDV were good. In contrast, the film of RV1 is good in the flatness but not good in cobalt corrosion, the film of RV2 is not good in the flatness or cobalt corrosion, and the film of RV3 is good in cobalt corrosion but not good in the flatness. Both of the flatness and cobalt corrosion are required to be good together, and the flattening film forming composition of the present invention, which can meet both of them, can be favorably used for a flattening film of an HDD.

INDUSTRIAL APPLICABILITY

The flattening film forming composition of the present invention can be used as a flattening film forming composition for a hard disk that flattens fine grooves (several tens of nanometers) in a process for producing a hard disk drive (HDD) and the filling part (nonmagnetic layer) can prevent a magnetic material such as a cobalt constituent from migrating to the filling part.

The invention claimed is:

1. A flattening film forming composition for a hard disk, comprising:
   a photopolymerizable coating material (1) containing at least one polymer selected from the group consisting of a homopolymer and a copolymer that has a divinyl aromatic compound-derived unit structure, or (2) containing a mixture comprising the at least one polymer and a photopolymerizable compound, wherein
   the coating material contains 1% by mole to 90% by mole of vinyl groups per mole of benzene rings.

2. The flattening film forming composition according to claim 1, wherein
   the divinyl aromatic compound is divinylbenzene.

3. The flattening film forming composition according to claim 1, wherein
   the photopolymerizable compound is a compound including an acrylate group, a methacrylate group, or a vinyl group.

4. The flattening film forming composition according to claim 1, wherein
   the polymer is a copolymer that further has an addition polymerizable compound-derived unit structure.

5. The flattening film forming composition according to claim 1, further comprising:
   a photopolymerization initiator; and
   a solvent.

6. A method for producing a hard disk, comprising:
   a first step of forming projections and recesses on a magnetic body;
   a second step of coating the projections and recesses with the flattening film forming composition as claimed in claim 1 to form a coating; and
   a third step of flattening the coating by means of etching and exposing a surface of the magnetic body.

7. The method for producing a hard disk according to claim 6, wherein
   the projections and recesses in the first step are formed by means of a nanoimprint method.

8. The method according to claim 6, wherein
   the coating in the second step is formed by a method of radiating light to the flattening film forming composition covering the projections and recesses formed in the first step so as to cure the flattening film forming composition.

9. The method according to claim 6, wherein
   the coating in the second step is formed by a method of radiating light to the flattening film forming composition covering the projections and recesses formed in the first step and further performing reflow with heat.

10. The method for producing a hard disk according to claim 6, wherein
    the flattening in the third step is performed by means of dry etching.

11. The method for producing a hard disk according to claim 10, wherein
    the dry etching uses a halogen-free dry etching gas.

12. The method for producing a hard disk according to claim 6, further comprising a fourth step of coating the flattened surface of the coating in the third step with a hard substance.

13. The method for producing a hard disk according to claim 12, wherein
    the hard substance used in the fourth step is diamond-like carbon.

14. The flattening film forming composition according to claim 1, wherein
    the coating material contains 1% by mole to 60% by mole of vinyl groups per mole of benzene rings.

15. The flattening film forming composition according to claim 1, wherein
    the coating material contains 1% by mole to 40% by mole of vinyl groups per mole of benzene rings.

16. The flattening film forming composition according to claim 1, wherein
    the coating material contains 1% by mole to 20% by mole of vinyl groups per mole of benzene rings.

17. The flattening film forming composition according to claim 1, wherein
    the coating material contains 1% by mole to 10% by mole of vinyl groups per mole of benzene rings.

18. The flattening film forming composition according to claim 1, wherein the coating material contains 40% by mole to 90% by mole of vinyl groups per mole of benzene rings.

* * * * *